United States Patent
Ramoutar et al.

(10) Patent No.: US 9,233,715 B1
(45) Date of Patent: Jan. 12, 2016

(54) BUMPER ASSEMBLIES INCLUDING SPACER MEMBERS AND VEHICLES INCORPORATING THE SAME

(71) Applicant: Toyota Motor Engineering & Manufacturing North America, Inc., Erlanger, KY (US)

(72) Inventors: Naipaul Ramoutar, Ann Arbor, MI (US); Behnaz Hajimohsen, Ypsilanti, MI (US); Kirankumar Sambatur, Northville, MI (US); Samuel King, Savannah, GA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/609,929

(22) Filed: Jan. 30, 2015

(51) Int. Cl.
  *B62D 25/08* (2006.01)
  *B62D 21/15* (2006.01)

(52) U.S. Cl.
  CPC .................................. *B62D 21/152* (2013.01)

(58) Field of Classification Search
  CPC ......... B60R 7/04; B60R 7/043; B62D 21/152
  USPC .................................. 296/37.5, 37.15, 37.16
  See application file for complete search history.

(56) References Cited

U.S. PATENT DOCUMENTS

| | | | |
|---|---|---|---|
| 6,736,449 B2 | 5/2004 | Takahashi et al. | |
| 6,997,491 B2 | 2/2006 | Takahashi | |
| 7,448,673 B2 | 11/2008 | Yasuhara | |
| 7,469,956 B2 * | 12/2008 | Yasuhara | B60R 19/34 293/133 |
| 7,810,878 B2 * | 10/2010 | Nakamura | B62D 21/11 296/203.02 |
| 7,850,227 B2 * | 12/2010 | Tamakoshi | B62D 21/11 296/193.09 |
| 7,887,123 B2 * | 2/2011 | Honji | B62D 21/152 280/488 |
| 8,333,425 B2 | 12/2012 | Yoshida | |
| 8,398,154 B1 | 3/2013 | Nusier et al. | |
| 8,454,080 B2 | 6/2013 | Qu et al. | |
| 8,496,287 B2 * | 7/2013 | Matsuura | B60R 19/34 293/132 |
| 8,596,711 B2 | 12/2013 | Yasui et al. | |
| 8,608,231 B1 | 12/2013 | Mendivil et al. | |
| 8,628,139 B2 * | 1/2014 | van Oirschot | B60G 7/02 296/187.09 |
| 8,851,520 B2 * | 10/2014 | Goellner | B62D 21/155 280/784 |
| 9,004,216 B1 * | 4/2015 | Baccouche | B60R 21/36 180/274 |
| 9,027,695 B2 * | 5/2015 | Nakamura | B62D 21/155 180/247 |

(Continued)

FOREIGN PATENT DOCUMENTS

| | | |
|---|---|---|
| EP | 2540575 | 1/2013 |
| JP | 2012228907 | 11/2012 |

(Continued)

*Primary Examiner* — Pinel Romain
(74) *Attorney, Agent, or Firm* — Dinsmore & Shohl LLP (57) ABSTRACT

Embodiments of vehicles including bumper assemblies having spacer members are discussed and disclosed herein. In one embodiment, a vehicle includes a side support that extends in a vehicle longitudinal direction, a sub-frame coupled to a body of the vehicle, where the sub-frame is positioned beneath the side support in a vehicle vertical direction, a bumper assembly including a rear face that is coupled to the side support, the bumper assembly including a reinforcement beam that extends in a vehicle lateral direction that is transverse to the vehicle longitudinal direction, and a spacer member coupled the rear face of bumper assembly, where the spacer member is positioned outboard of the side support in the vehicle lateral direction and where the spacer member extends from the side support toward the sub-frame in the vehicle vertical direction.

20 Claims, 6 Drawing Sheets

(56) References Cited

U.S. PATENT DOCUMENTS

| | | | | |
|---|---|---|---|---|
| 9,067,549 | B2 * | 6/2015 | Baccouche | B62D 21/152 |
| 2012/0248819 | A1 * | 10/2012 | Okamura | B60R 19/12 |
| | | | | 296/187.1 |
| 2012/0248820 | A1 * | 10/2012 | Yasui | B60R 19/34 |
| | | | | 296/187.09 |
| 2012/0313398 | A1 * | 12/2012 | Shin | B62D 21/152 |
| | | | | 296/187.1 |
| 2013/0325051 | A1 | 10/2013 | Nakamura et al. | |
| 2013/0320709 | A1 | 12/2013 | Kuwabara et al. | |
| 2014/0061206 | A1 | 3/2014 | Han | |
| 2014/0062129 | A1 | 3/2014 | Syel et al. | |
| 2014/0091585 | A1 | 4/2014 | Ramoutar et al. | |
| 2014/0091595 | A1 | 4/2014 | Ramoutar et al. | |

FOREIGN PATENT DOCUMENTS

| | | |
|---|---|---|
| JP | 2014113893 | 6/2014 |
| WO | WO2013172132 | 11/2013 |
| WO | WO2014007403 | 1/2014 |

* cited by examiner

BUMPER ASSEMBLIES INCLUDING SPACER MEMBERS AND VEHICLES INCORPORATING THE SAME

TECHNICAL FIELD

The present specification generally relates to bumper assemblies and vehicles that include bumper assemblies, and more specifically, bumper assemblies that include spacer members.

BACKGROUND

Vehicles may be equipped with bumper systems and impact protection structures that elastically and plastically deform to absorb energy in the event of an impact.

In one example, a substantial portion of energy from an impact with a small front bumper overlap may be directed outboard of many of the energy absorbing structures of the vehicle. Because a substantial portion of the energy from the impact is directed into the bumper assembly at a position that is outboard of many of the energy absorbing structures of the vehicle, the energy from the impact may not be absorbed or may only be partially absorbed by those energy absorbing structures of the vehicle. The unabsorbed energy may be directed into a front suspension unit and transferred rearward along the vehicle as the front suspension unit contacts vehicle structures proximate to a passenger cabin of the vehicle.

Accordingly, a need exists for alternative structures for transferring energy and absorbing energy from an impact with a small overlap to the front bumper.

SUMMARY

In one embodiment, a vehicle includes a side support that extends in a vehicle longitudinal direction, a sub-frame coupled to a body of the vehicle, where the sub-frame is positioned beneath the side support in a vehicle vertical direction, a bumper assembly including a rear face that is coupled to the side support, the bumper assembly including a reinforcement beam that extends in a vehicle lateral direction that is transverse to the vehicle longitudinal direction, and a spacer member coupled the rear face of bumper assembly, where the spacer member is positioned outboard of the side support in the vehicle lateral direction and where the spacer member extends from the side support toward the sub-frame in the vehicle vertical direction.

In another embodiment, a vehicle includes a side support that extends in a vehicle longitudinal direction, the side support including an outboard face, a side support catcher portion that is coupled to the outboard face of the side support and that extends outboard of the side support in a vehicle lateral direction, a sub-frame coupled to a body of the vehicle and positioned beneath the side support in a vehicle vertical direction, a sub-frame catcher portion coupled to the sub-frame, a bumper assembly including a rear face that is coupled to the side support and a reinforcement beam that extends in the vehicle lateral direction, and a spacer member coupled the bumper assembly, where the spacer member is positioned outboard of the side support in the vehicle lateral direction and where the spacer member includes an upper portion that is spaced apart from the side support catcher portion in the vehicle longitudinal direction and a lower portion that is spaced apart from the sub-frame catcher portion in the vehicle longitudinal direction.

In yet another embodiment, a vehicle includes a side support that extends in a vehicle longitudinal direction, a sub-frame coupled to a body of the vehicle and positioned beneath the side support in a vehicle vertical direction, a bumper assembly including a rear face that is coupled to the side support, the bumper assembly including a reinforcement beam that extends in a vehicle lateral direction that is transverse to the vehicle longitudinal direction, and a spacer member coupled the rear face of bumper assembly, where the spacer member is positioned outboard of and spaced apart from the side support in the vehicle lateral direction and where the spacer member extends between at least the side support and the sub-frame in the vehicle vertical direction.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Vehicles according to the present specification include a side support that extends in a vehicle longitudinal direction and a sub-frame that is positioned beneath the side support in a vehicle vertical direction. A bumper assembly that includes a rear face is coupled to the side support, the bumper assembly including a reinforcement beam that extends in a vehicle lateral direction that is transverse to the vehicle longitudinal direction. A spacer member is coupled the rear face of bumper assembly, where the spacer member is positioned outboard of the side support in the vehicle lateral direction and where the spacer member extends between at least the side support and the sub-frame in the vehicle vertical direction. In some embodiments, the side support includes a side support catcher member portion and a sub-frame catcher portion that are positioned rearward of the spacer member. In other embodiments, the spacer member is spaced apart from the side support in the vehicle lateral direction. During a small front bumper overlap impact, the spacer member may assist in transmitting energy and/or forces associated with the impact to the side support, thereby reducing the amount of energy and/or forces that are directed into a passenger cabin of the vehicle, as will be described herein.

Figure 1:
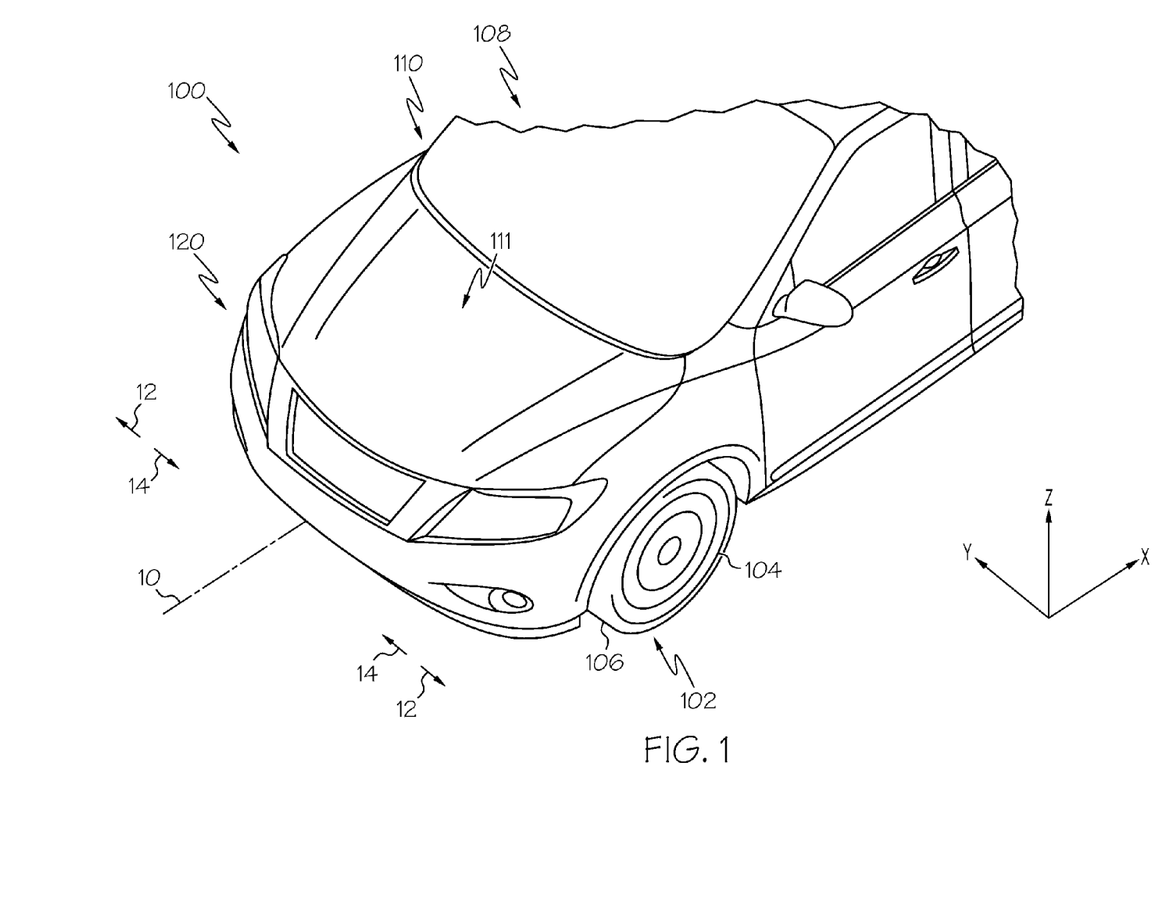
FIG. 1 schematically depicts a perspective view of a vehicle according to one or more embodiments shown or described herein.

As used herein, the term "vehicle longitudinal direction" refers to the forward-rearward direction of the vehicle (i.e., in the +/− vehicle X-direction as depicted). The term "vehicle lateral direction" refers to the cross-vehicle direction (i.e., in the +/− vehicle Y-direction as depicted), and is transverse to the vehicle longitudinal direction. The term "vehicle vertical direction" refers to the upward-downward direction of the vehicle (i.e., in the +/− vehicle Z-direction as depicted). Further, the terms "inboard" and "outboard" are used to describe the relative positioning of various components of the vehicle. Referring to FIG. 1, the term "outboard" as used herein refers to the relative location of a component in direction 12 with respect to a vehicle centerline 10. The term "inboard" as used herein refers to the relative location of a component in direction 14 with respect to the vehicle centerline 10. Because the vehicle structures may be generally symmetrical about the vehicle centerline 10, the direction to which use of terms "inboard" and "outboard" refer may be mirrored about the vehicle centerline 10 when evaluating components positioned along opposite sides of the vehicle 100.

Motor vehicles that incorporate elements according to the present disclosure may include a variety of construction methodologies that are conventionally known, including the unibody construction methodology depicted in FIG. 1 as well as a body-on-frame construction methodology. While the embodiments of the present disclosure are described and depicted herein in reference to unibody structures, it should be understood that vehicles that are constructed with body-on-frame construction may incorporate the elements that are shown and described herein. Furthermore, the Figures may only show one side of the vehicle. Descriptions of the other side of the vehicle may be omitted because both sides of the vehicle may be laterally symmetrical and substantially the same.

Referring initially to FIG. 1, a vehicle 100 is depicted. The vehicle 100 includes a body 110 onto which a vehicle drivetrain is coupled. The vehicle 100 also includes a cabin 108 that is integral with the body 110 and a front bay 111 where a drive source (e.g., an internal combustion engine and/or electric motor) may be located. In some embodiments, the drive source may be positioned in a rear portion of the vehicle, and the front bay 111 may utilized as a storage compartment. The cabin 108 generally defines a passenger cabin of the vehicle 100.

A front suspension unit 102 may be coupled to the body 110. The front suspension unit 102 may be coupled to a side support 112 (FIG. 2) and/or a sub-frame 118 (FIG. 2) of the body 110. As used herein, the front suspension unit 102 may generally include vehicle components that connect the body 110 to a tire 106. The front suspension unit 102 may include a wheel 104 that is surrounded by the tire 106.

Figure 2:
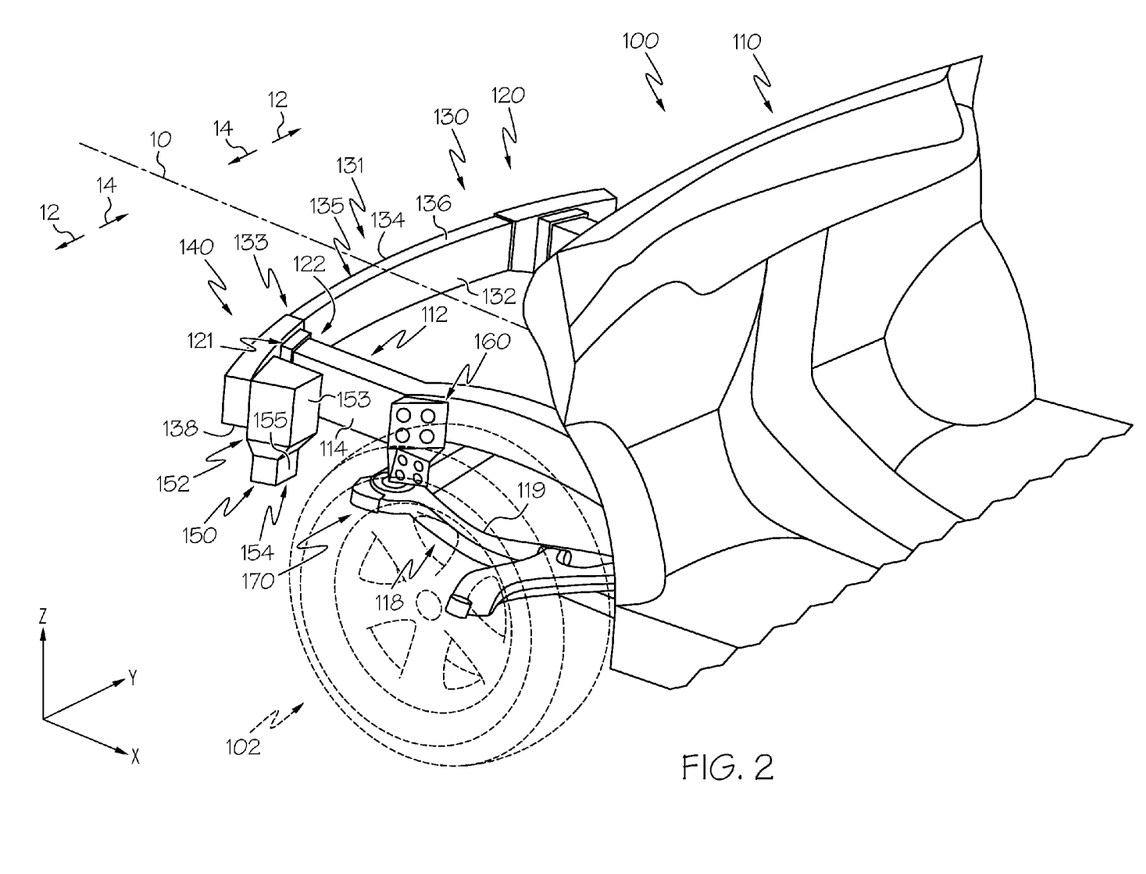
FIG. 2 schematically depicts a perspective view of a vehicle including a bumper assembly and a spacer member according to one or more embodiments shown or described herein.

Referring to FIG. 2, the body 110 of the vehicle 100 and a bumper assembly 120 are depicted with certain panels removed for clarity. The bumper assembly 120 is positioned at the front of the vehicle 100. The bumper assembly 120 includes a rear face 122 that is coupled to the side support 112. The bumper assembly 120 includes a reinforcement beam 130 that extends in the vehicle lateral direction. The reinforcement beam 130 may be coupled to the side support 112 at a bumper assembly securement location 121. The side support 112 may include a crush box 124 that is coupled to the rear face 132 of the bumper assembly 120.

The side support 112 extends in the vehicle longitudinal direction between a front portion of the vehicle 100 and a rear portion of the vehicle 100. The side support may extend between the bumper assembly 120 which is positioned at the front portion of the vehicle and a rear bumper assembly (not depicted) that is positioned at the rear portion of the vehicle. As described above, the front suspension unit 102 may be coupled to the side support 112.

Figure 4:
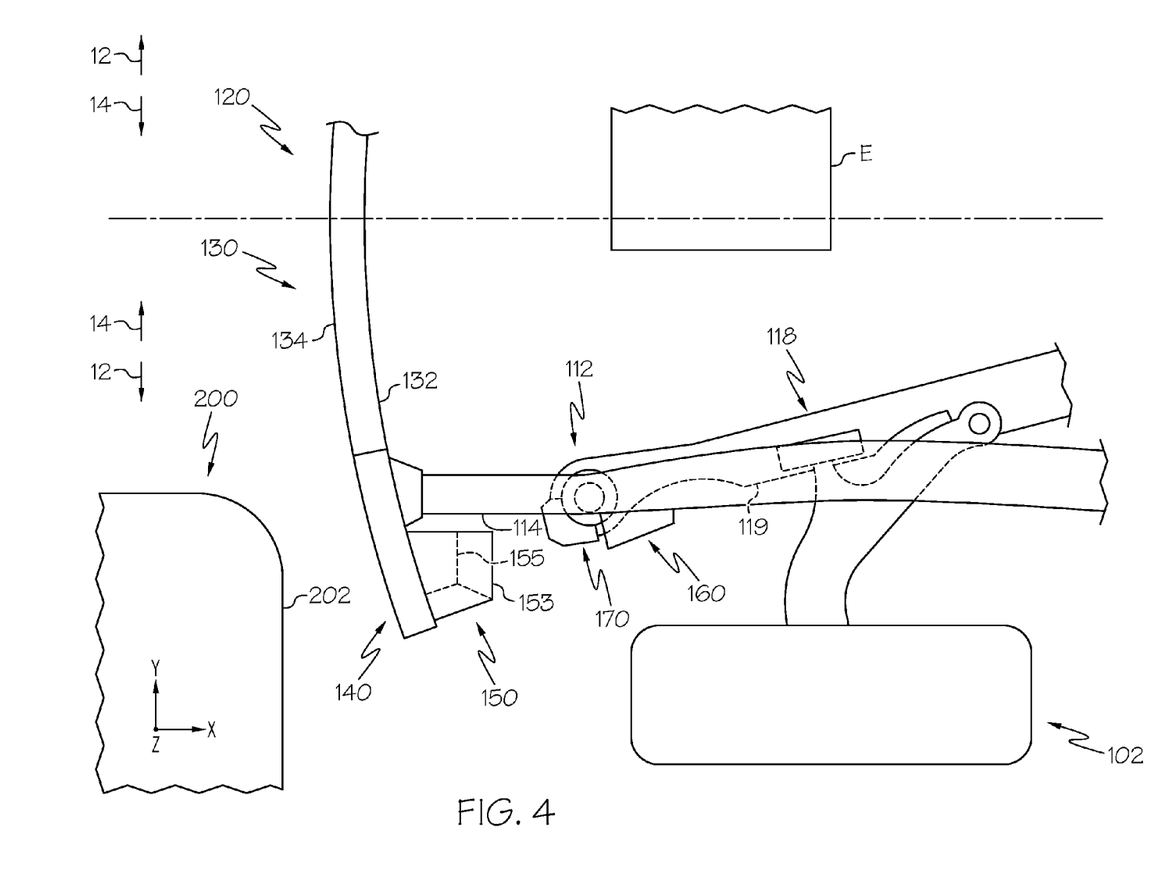
FIG. 4 schematically depicts a top view of the bumper assembly and the spacer member shown in FIG. 3 prior to a small front bumper overlap impact according to one or more embodiments shown or described herein.

Referring now to FIGS. 2 and 4 collectively, the body 110 includes the sub-frame 118 coupled to the body 110 and positioned beneath the side support 112 in the vehicle vertical direction. The sub-frame 118 may be coupled to the body 110 through a variety of joining techniques, including, but not limited to, a welded attachment, a brazed attachment, mechanical fasteners, and/or structural adhesives. The sub-frame 118 of the body 110 may be coupled to various elements of the vehicle 100, such as steering components (not depicted), the vehicle drive source, and/or the front suspension unit 102. The sub-frame includes a longitudinal member 119 that generally extends in the vehicle longitudinal direction. The longitudinal member 119 may be positioned below the side support 112 in the vehicle vertical direction, and may be coupled to the suspension unit 102 and/or the drive source.

The reinforcement beam 130 may have a generally curved shape, as depicted in FIG. 2. More specifically, an inboard position 131 on a front face 134 of the reinforcement beam 130 may be positioned forward of an outboard position 133 on the front face 134 of the reinforcement beam 130 in the vehicle longitudinal direction, thereby giving the reinforcement beam 130 a generally curved shape. In other embodiments, the reinforcement beam 130 may have a generally straight shape extending in the vehicle lateral direction. The reinforcement beam 130 may alternatively have any suitable shape that extends in the vehicle lateral direction.

The bumper assembly 120 may include a bumper extension portion 140 that is positioned at outboard end of the reinforcement beam 130. While reference is made herein to one bumper extension portion 140, it should be understood that the bumper assembly 120 may include a similar or same bumper extension portion 140 at the opposite outboard end of the reinforcement beam 130. The bumper extension portion 140 may extend outboard beyond the side support 112 in the vehicle lateral direction. In some embodiments, the bumper extension portion 140 may be integrally formed with a central portion 135 of the reinforcement beam 130. In other embodiments, the bumper extension portion 140 may be formed as a separate member that is coupled to the central portion 135 of the reinforcement beam 130. In either instance, the bumper extension portion 140 may be considered part of the reinforcement beam 130. The bumper extension portion 140 and the reinforcement beam 130 may be formed from a variety of materials including, for example and without limitation, metals, composites, and the like, and may be formed by any suitable method or combination of methods such as stamping, forging, machining, and the like. The bumper extension portion 140 and the reinforcement beam 130 may be formed from the same material or different materials. The bumper extension portion 140 may be coupled to the reinforcement beam 130 through a variety of joining techniques, including, but not limited to, a welded attachment, a brazed attachment, mechanical fasteners, and/or structural adhesives.

The bumper assembly 120 including the reinforcement beam 130 and the bumper extension portion 140 include the front face 134 that is oriented to face forward in the vehicle longitudinal direction. The front face 134 of the reinforcement beam 130 and/or the bumper extension portion 140 may be a generally planar surface that extends in the vehicle lateral direction. In other embodiments, the front face 134 of the reinforcement beam 130 and/or the bumper extension portion 140 may include a contoured surface that extends in the vehicle lateral direction. The front face 134 may be contoured at one of the reinforcement beam 130 or the bumper extension portion 140 and may be generally planar at the other. The reinforcement beam 130 and/or the bumper extension portion 140 further include a top face 136 and a bottom face 138 that is positioned opposite the top face 136. The top face 136 and the bottom face 138 of the reinforcement beam 130 and/or the bumper extension portion 140 may be oriented transverse to the front face 134, and may extend rearward from the front face 134. The reinforcement beam 130 and/or the bumper extension portion 140 include the rear face 132 that is positioned opposite of the front face 134. The rear face 132 of the reinforcement beam 130 and/or the bumper extension portion 140 is generally transverse to the top face 136 and the bottom face 138 of the reinforcement beam 130 and/or the bumper extension portion 140, and the rear face 132 is oriented to face rearward in the vehicle longitudinal direction.

A spacer member 150 is coupled to the rear face 132 of the reinforcement beam 130 and/or the bumper extension portion 140 at a position that is outboard of the side support 112. The spacer member 150 may be positioned outboard of the side support 112 such that the spacer member 150 is spaced apart and detached from the side support 112 in the vehicle lateral direction. As the spacer member 150 may be spaced apart and detached from the side support 112, during an impact, the spacer member 150 may selectively translate inboard and direct energy and/or force associated with a small front bumper overlap impact into the side support 112.

The spacer member 150 may be coupled to the rear face 132 of the reinforcement beam 130 and/or the bumper extension portion 140 through a variety of joining techniques, including, but not limited to, a welded attachment, a brazed attachment, mechanical fasteners, and/or structural adhesives. The spacer member 150 may be formed from a variety of materials including, for example and without limitation, metals, composites, and the like, and may be formed by any suitable method or combination of methods such as stamping, forging, machining, and the like. The spacer member 150 may include an upper portion 152 and a lower portion 154 that is positioned beneath the upper portion 152 of the spacer member 150 in the vehicle vertical direction.

A side support catcher portion 160 may be coupled to the side support 112. The side support catcher portion 160 may be coupled to and extend outboard of an outboard side 114 of the side support 112 at a location that is spaced apart from and rearward of the spacer member 150 in the vehicle longitudinal direction. The side support catcher portion 160 may also be aligned with the upper portion 152 of the spacer member 150 in the vehicle lateral direction and the vehicle vertical direction. The side support catcher portion 160 may be coupled to the outboard side 114 of the side support 112 through a variety of joining techniques, including, but not limited to, a welded attachment, a brazed attachment, mechanical fasteners, and/or structural adhesives. The side support catcher portion 160 may be may be formed from a variety of materials including, for example and without limitation, metals, composites, and the like, and may be formed by any suitable method or combination of methods such as stamping, forging, machining, and the like.

A sub-frame catcher portion 170 may be coupled to the sub-frame 118 of the body 110 that is positioned beneath the side support 112 in the vehicle vertical direction. The sub-frame catcher portion 170 may be coupled to the longitudinal member 119 of the sub-frame 118. The sub-frame catcher portion 170 may be coupled to the sub-frame 118 at a location that is spaced apart from and rearward of the spacer member 150 in the vehicle longitudinal direction, but aligned with the lower portion 154 of the spacer member 150 in the vehicle lateral direction and the vehicle vertical direction. The sub-frame catcher portion 170 may be coupled to the sub-frame 118 through a variety of joining techniques, including, but not limited to, a welded attachment, a brazed attachment, mechanical fasteners, and/or structural adhesives. The sub-frame catcher portion 170 may be may be formed from a variety of materials including, for example and without limitation, metals, composites, and the like, and may be formed by any suitable method or combination of methods such as stamping, forging, machining, and the like.

Figure 3:
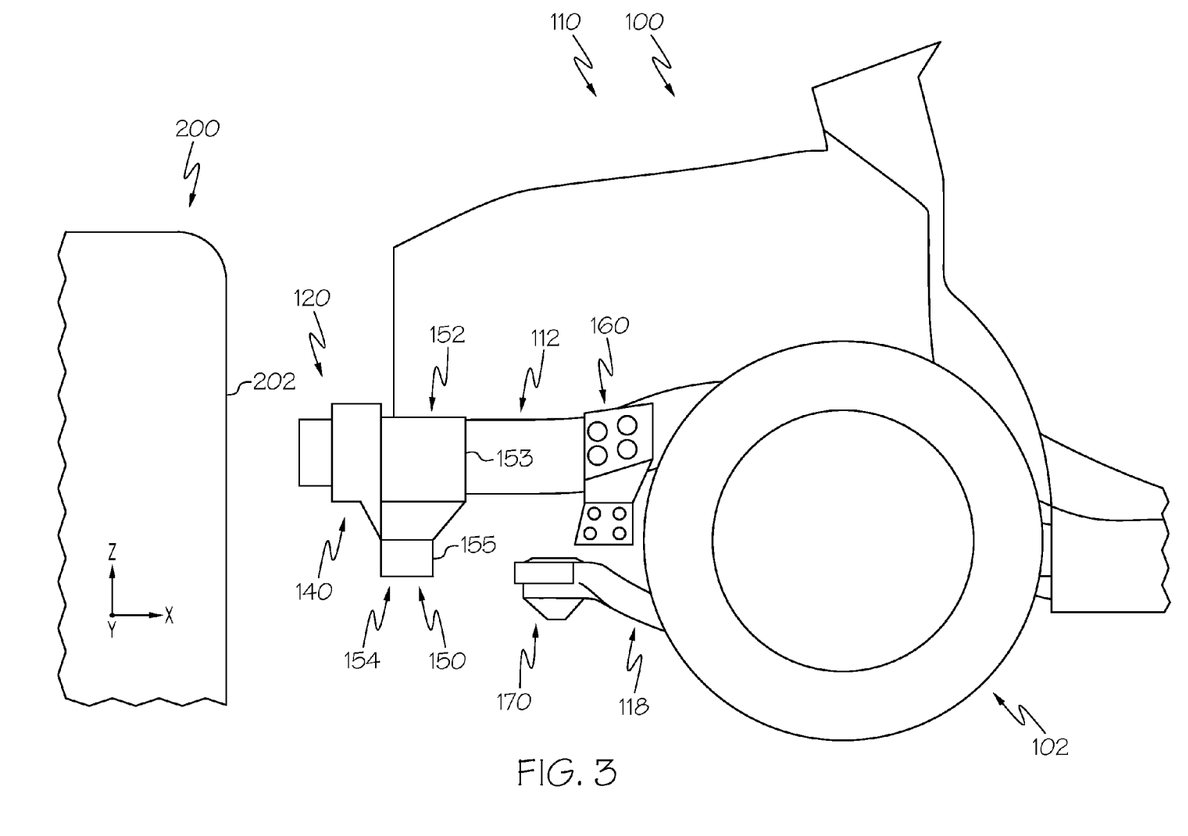
FIG. 3 schematically depicts a side view of the bumper assembly and the spacer member shown in FIG. 2 prior to a small front bumper overlap impact according to one or more embodiments shown or described herein.

Referring now to FIG. 3, a side view of the spacer member 150, the side support catcher portion 160, and the sub-frame catcher portion 170 is depicted. The sub-frame catcher portion 170 may be positioned forward of the side support catcher portion 160 in the vehicle longitudinal direction. Both the side support catcher portion 160 and the sub-frame catcher portion 170 may be positioned at least partially forward of the front suspension unit 102.

The spacer member 150 extends between the side support 112 and the sub-frame 118 in the vehicle vertical direction. The upper portion 152 of the spacer member 150 may include a side support engagement face 153 that is oriented to face rearward in the vehicle longitudinal direction. Similarly, the lower portion 154 of spacer member 150 may include a sub-frame engagement face 155 that is oriented to face rearward in the vehicle longitudinal direction. The side support engagement face 153 of the upper portion 152 may be positioned rearward of the sub-frame engagement face 155 of the lower portion 154 in the vehicle longitudinal direction.

Referring collectively to FIGS. 3 and 4, during ordinary vehicle operation, the spacer member 150 may be positioned in a deactivated configuration. In the deactivated configuration, the side support engagement face 153 and the sub-frame engagement face 155 of the spacer member 150 may be detached and spaced apart from the side support catcher portion 160 and the sub-frame catcher portion 170, respectively, in the vehicle longitudinal direction. However, the side support engagement face 153 and the sub-frame engagement face 155 may be aligned with the side support catcher portion 160 and the sub-frame catcher portion 170 in the vehicle vertical direction. Further, the spacer member 150 may be detached and spaced apart from the outboard face 114 of the side support 112 in the vehicle lateral direction. The spacer member 150 and the side support catcher portion 160 and the sub-frame catcher portion 170 may assist transferring energy associated with an impact, such as a small front bumper overlap impact, from the reinforcement beam 130 and/or the bumper extension portion 140 to the side support 112.

When a vehicle impacts a barrier, vehicle structures may elastically and plastically deform to absorb energy while slowing the vehicle from its previous operating speed. The vehicle structures divert and absorb the energy associated with the moving vehicle into energy that deforms the vehicle structures. The vehicle structures may be designed to accommodate the introduction of the energy of the impact, such that the energy associated with the impact may be controllably dissipated and directed through selective and preferential deformation of the vehicle structures.

The front corner of the vehicle may impact an object in what is referred to herein as a small front bumper overlap or a small overlap impact. In a small front bumper overlap impact, the impact occurs at an outboard portion of the vehicle (evaluated in a vehicle lateral direction), and only a portion of the front bumper strikes the object. In some small front bumper overlap impacts, no more than about 25% of the front bumper strikes the object. In such impacts, some of the energy dissipation elements of the vehicle may not be initiated or may be only partially initiated. In such impacts, the energy that is introduced to the vehicle structures may be non-symmetrical when evaluated in the vehicle lateral direction. Accordingly, the reaction of the vehicle structures to the energy introduced by the small overlap impacts may introduce a non-symmetrical response to the vehicle structures. Referring to embodiments disclosed herein, the structural members of the body 110 for example, may be non-symmetrically loaded when the vehicle is involved in a small overlap impact.

Because only a portion of the front bumper strikes an object during a small front bumper overlap impact, all of the energy absorbing structures associated with the front bumper may have a reduced effect on the dissipation of energy of the impact. In particular, some of the energy absorbing structures associated with the bumper assembly 120 of the vehicle 100 may not be activated or may be only partially activated, such that a portion of the energy absorbing structure of the vehicle may not dissipate energy associated with the small front bumper overlap impact. Instead, the energy and/or forces associated with the impact may be directed into the front suspension unit 102 of the vehicle 100 proximate to the barrier that the vehicle impacts. As energy from the impact may be directed into the front suspension unit 102 of the vehicle 100, the front suspension unit 102 may translate rearward in the vehicle longitudinal direction and may contact the cabin 108 of the vehicle, transmitting energy and/or forces associated with the impact into the cabin 108 of the vehicle 100.

FIGS. 3 and 4 illustrate the vehicle 100 prior to a small front bumper overlap impact with a barrier, for example, during a small front bumper overlap impact test. In a small front bumper overlap impact or small front bumper overlap test, the vehicle 100 may impact a barrier 200 (or vice versa). A vehicle-facing surface 202 of the barrier 200 may extend in a direction that is transverse to the vehicle longitudinal direction. Accordingly, in such impact configurations, the reinforcement beam 130 extends generally in the same direction as the vehicle-facing surface 202 of the barrier 200. In some impact configurations, such as the small front bumper overlap impact depicted in FIGS. 5 and 6, the bumper extension portion 140 of the bumper assembly 120 may at least partially overlap the vehicle-facing surface 202 of the barrier 200 in the vehicle lateral direction.

The vehicle-facing surface 202 of the barrier 200 may impact the bumper extension portion 140 of the bumper assembly 120. As the bumper extension portion 140 overlaps the vehicle-facing surface 202 of the barrier 200, the impact between the vehicle-facing surface 202 of the barrier 200 and the bumper assembly 120 may be directed into the bumper extension portion 140. As energy and/or force associated with the impact is directed into the bumper extension portion 140, the bumper extension portion 140 may plastically and elastically deform and translate rearward in the vehicle longitudinal direction.

As described above, the reinforcement beam 130 and/or the bumper extension portion 140 is coupled to the side support 112. As the bumper extension portion 140 and the bumper assembly 120 may initially deform and translate primarily rearward in the vehicle longitudinal direction, the reinforcement beam 130 may direct force and/or energy associated with the impact into the side support 112 such that the energy is directed rearward in the vehicle longitudinal direction. Because the energy and/or forces associated with the impact are initially directed rearward in the vehicle longitudinal direction, the side support 112 may remain near its original longitudinal orientation as opposed to rotating inboard or outboard and away from the impact. As the energy associated with the impact causes the side support 112 to plastically and elastically deform, the side support 112 may continue to absorb energy. By absorbing energy associated with the impact, the side support 112 may reduce the amount of energy that is directed rearward toward the passenger cabin of the vehicle 100. Accordingly, by directing energy associated with the impact rearward in the vehicle longitudinal direction, the side support 112 may reduce the amount of energy associated with the impact that is directed into the passenger cabin of the vehicle 100.

Figure 5:
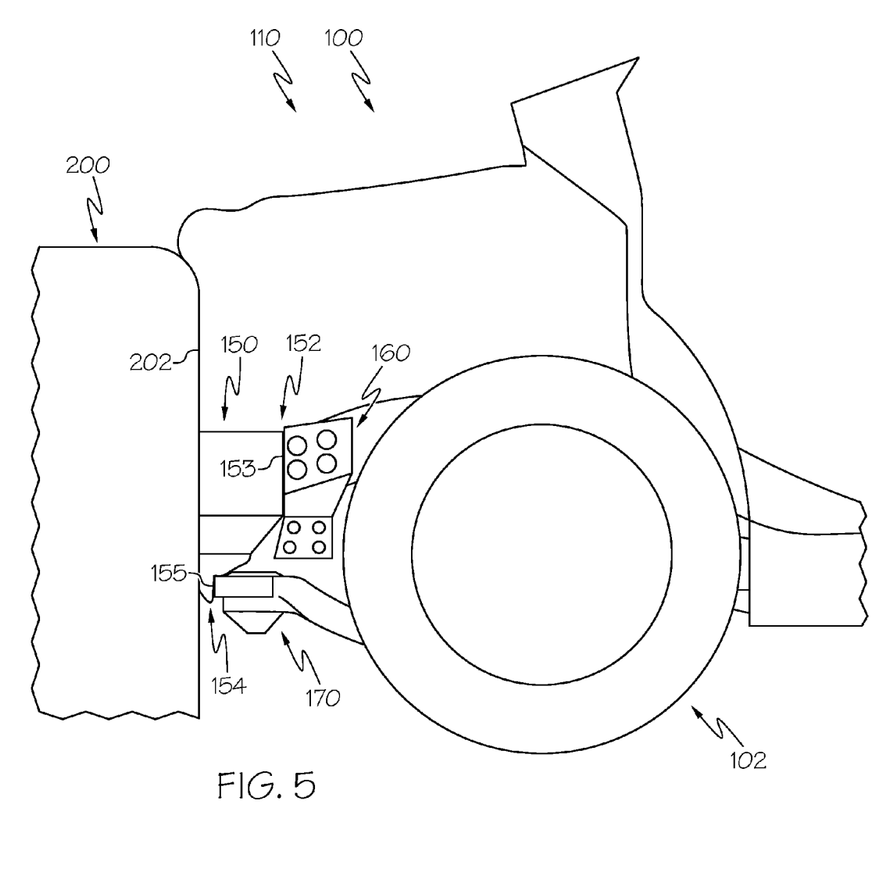
FIG. 5 schematically depicts a side view of the bumper assembly and the spacer member shown in FIG. 4 during a small front bumper overlap impact according to one or more embodiments shown or described herein.
Figure 6:
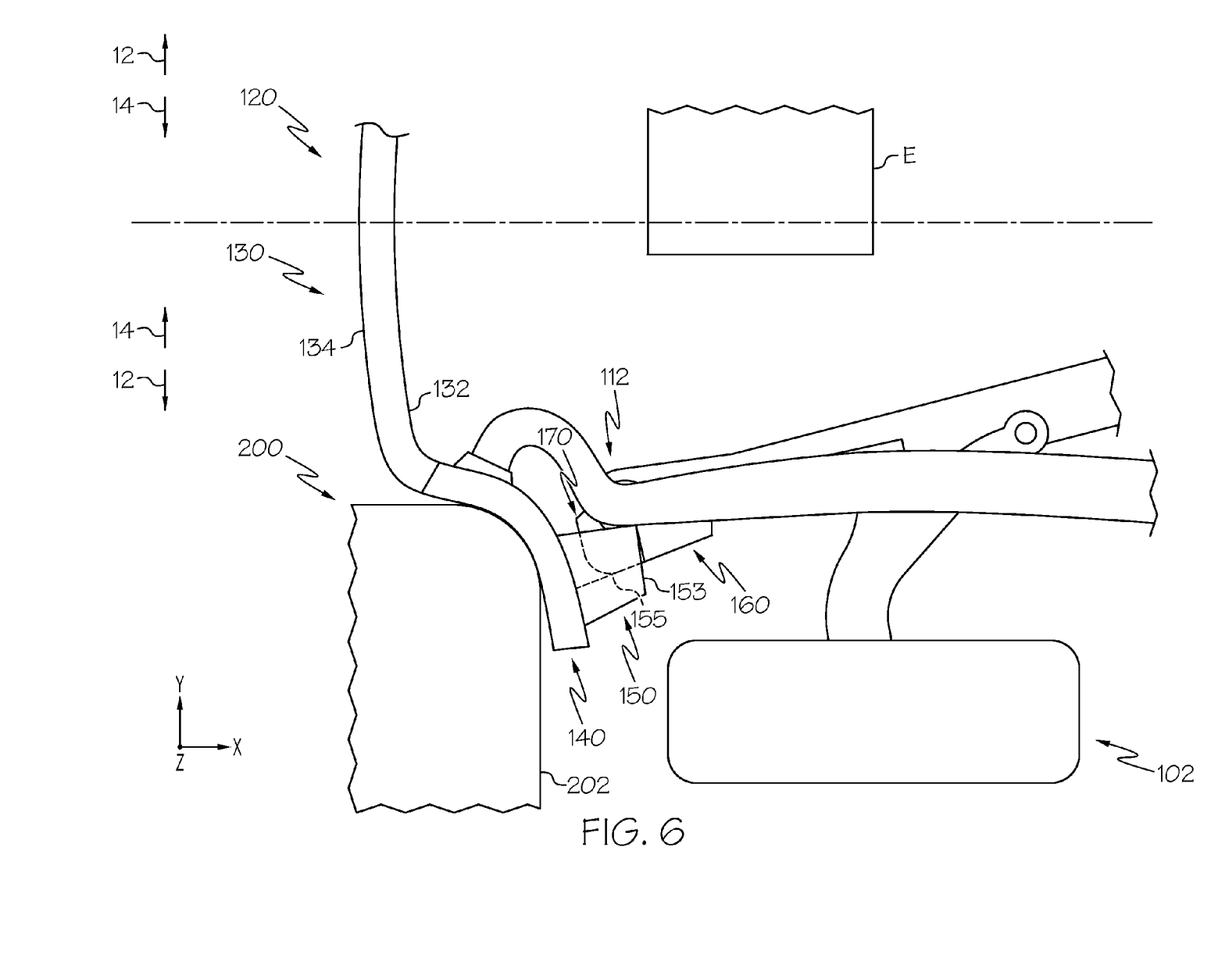
FIG. 6 schematically depicts a top view of the bumper assembly and the spacer member shown in FIG. 5 during the small front bumper overlap impact according to one or more embodiments shown or described herein.

Referring collectively to FIGS. 5 and 6, as the bumper assembly 120 plastically and elastically deforms and translates rearward in the vehicle longitudinal direction, energy associated with the impact may reposition the bumper extension portion 140 from the deactivated configuration into an activated configuration. In the activated configuration, the spacer member 150 that is coupled to the reinforcement beam 130 and/or the bumper extension portion 140 is brought into contact with the side support catcher portion 160 and the sub-frame catcher portion 170. More specifically, the upper portion 152 of the spacer member 150 is brought into contact with the side support catcher portion 160 and the lower portion 154 of the spacer member 150 is brought into contact with the sub-frame catcher portion 170. In some impact configurations the side support engagement face 153 of the upper portion 152 may contact the side support catcher portion 160 and the sub-frame engagement face 155 of the lower portion 154 may contact the sub-frame catcher portion 170.

Contact between the spacer member 150 and the side support catcher portion 160 and the sub-frame catcher portion 170 may restrict further rearward translation of the bumper assembly 120 and the bumper extension portion 140 in the vehicle longitudinal direction. As described hereinabove, at least a portion of the side support catcher portion and the sub-frame catcher portion 170 are positioned forward of the front suspension unit 102 in the vehicle longitudinal direction. Accordingly, by restricting further rearward translation of the bumper assembly 120, contact between the spacer member 150 and the side support catcher portion 160 and the sub-frame catcher portion 170 may reduce the energy and/or forces associated with the impact that are directed into the front suspension unit 102. Contact between the spacer member 150 and the side support catcher portion 160 and the sub-frame catcher portion 170 may thereby reduce energy and/or forces that are directed into the cabin 108 of the vehicle 100 through contact between the front suspension unit 102 and the cabin 108.

Further, contact between the spacer member 150 and the side support catcher portion 160 and the sub-frame catcher portion 170 may provide a load path between the bumper assembly 120 and the side support 112 as well as between the bumper assembly 120 and the sub-frame 118. In particular, energy and/or forces associated with the impact may be directed into the side support 112 through contact between the upper portion 152 of the spacer member 150 and the side support catcher portion 160. Similarly, energy and/or forces associated with the impact may be directed into the sub-frame 118 through contact between the lower portion 154 of the spacer member 150 and the sub-frame catcher portion 170. As energy and/or forces associated with the impact may be directed into the side support 112 and the sub-frame 118, the energy and/or forces associated with the impact may selectively deform the side support 112 and the sub-frame 118, thereby reducing the energy and/or forces associated with the impact that may be directed into the cabin 108 (FIG. 1) of the vehicle 100.

Accordingly, the above-described vehicles include a side support that extends in a vehicle longitudinal direction and a sub-frame that is positioned beneath the side support in a vehicle vertical direction. A bumper assembly that includes a rear face is coupled to the side support, the bumper assembly including a reinforcement beam that extends in a vehicle lateral direction that is transverse to the vehicle longitudinal direction. A spacer member is coupled the rear face of bumper assembly, where the spacer member is positioned outboard of the side support in the vehicle lateral direction and where the spacer member extends between at least the side support and the sub-frame in the vehicle vertical direction. In some embodiments, the side support includes a side support catcher member portion and a sub-frame catcher portion that are positioned rearward of the spacer member. In other embodiments, the spacer member is spaced apart from the side support in the vehicle lateral direction. As the spacer member extends between the side support and the sub-frame, during a small front bumper overlap impact, as the spacer member translates rearward, the spacer member may contact and direct energy and/or forces associated with the impact into both the side support and the sub-frame, thereby reducing energy and/or forces associated with the impact directed toward a passenger cabin of the vehicle.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
a side support that extends in a vehicle longitudinal direction;
a sub-frame coupled to a body of the vehicle, wherein the sub-frame is positioned beneath the side support in a vehicle vertical direction;
a bumper assembly comprising a rear face that is coupled to the side support, the bumper assembly including a reinforcement beam that extends in a vehicle lateral direction that is transverse to the vehicle longitudinal direction; and
a spacer member coupled the rear face of bumper assembly, wherein the spacer member is positioned outboard of the side support in the vehicle lateral direction and wherein the spacer member extends from the side support toward the sub-frame in the vehicle vertical direction.

2. The vehicle of claim 1, wherein the side support comprises an outboard face, and wherein the vehicle further comprises a side support catcher portion that is coupled to and extends outboard from the outboard face of the side support, wherein the side support catcher portion is positioned rearward of the spacer member in the vehicle longitudinal direction.

3. The vehicle of claim 2, wherein the spacer member comprises a side support engagement face that is oriented to face rearward in the vehicle longitudinal direction and that is detached and spaced apart from the side support catcher portion in the vehicle longitudinal direction.

4. The vehicle of claim 2, wherein the spacer member is repositionable between an activated configuration and a deactivated configuration, wherein the spacer member is detached and spaced apart from the side support catcher portion in the deactivated configuration and the spacer member is in contact with the side support catcher portion in the activated configuration.

5. The vehicle of claim 1, further comprising a sub-frame catcher portion coupled the sub-frame, wherein the sub-frame catcher portion is positioned rearward of the spacer member in the vehicle longitudinal direction.

6. The vehicle of claim 5, wherein the spacer member comprises a sub-frame engagement face that is oriented to face rearward in the vehicle longitudinal direction and is detached and spaced apart from the sub-frame catcher portion in the vehicle longitudinal direction.

7. The vehicle of claim 5, wherein the spacer member is repositionable between an activated configuration and a deactivated configuration, wherein the spacer member is detached and spaced apart from the sub-frame catcher portion in the deactivated configuration and the spacer member is in contact with the sub-frame catcher portion in the activated configuration.

8. The vehicle of claim 1, wherein the bumper assembly further comprises a bumper extension portion that is coupled to an outboard end of the reinforcement beam and the spacer member is coupled to the bumper extension portion.

9. A vehicle comprising:
a side support that extends in a vehicle longitudinal direction, the side support comprising an outboard face;
a side support catcher portion that is coupled to the outboard face of the side support and that extends outboard of the side support in a vehicle lateral direction;
a sub-frame coupled to a body of the vehicle and positioned beneath the side support in a vehicle vertical direction;
a sub-frame catcher portion coupled to the sub-frame;
a bumper assembly comprising a rear face that is coupled to the side support and a reinforcement beam that extends in the vehicle lateral direction; and
a spacer member coupled the bumper assembly, wherein the spacer member is positioned outboard of the side support in the vehicle lateral direction and wherein the spacer member comprises an upper portion that is spaced apart from the side support catcher portion in the vehicle longitudinal direction and a lower portion that is spaced apart from the sub-frame catcher portion in the vehicle longitudinal direction.

10. The vehicle of claim 9, wherein the spacer member is repositionable between an activated configuration and a deactivated configuration, wherein the spacer member is detached and spaced apart from the side support catcher portion and the sub-frame catcher portion in the vehicle longitudinal direction in the deactivated configuration and the spacer member is in contact with the side support catcher portion and the sub-frame catcher portion in the activated configuration.

11. The vehicle of claim 9, wherein the side support catcher portion is positioned rearward of the sub-frame catcher portion in the vehicle longitudinal direction.

12. The vehicle of claim 9, wherein the spacer member comprises a side support engagement face and a sub-frame engagement face that is positioned beneath the side support engagement face in the vehicle vertical direction.

13. The vehicle of claim 12, wherein the side support engagement face and the sub-frame engagement face are oriented to face rearward in the vehicle longitudinal direction.

14. The vehicle of claim 13, wherein the side support engagement face is positioned rearward of the sub-frame engagement face in the vehicle longitudinal direction.

15. The vehicle of claim 9, further comprising a front suspension unit coupled to the side support, wherein at least a portion of the side support catcher portion and the sub-frame catcher portion are positioned forward of the front suspension unit.

16. The vehicle of claim 9, wherein the bumper assembly further comprises a bumper extension portion that is coupled to an outboard end of the reinforcement beam and the spacer member is coupled to the bumper extension portion.

17. A vehicle comprising:
a side support that extends in a vehicle longitudinal direction;
a sub-frame coupled to a body of the vehicle and positioned beneath the side support in a vehicle vertical direction;
a bumper assembly comprising a rear face that is coupled to the side support, the bumper assembly comprising a reinforcement beam that extends in a vehicle lateral direction that is transverse to the vehicle longitudinal direction; and
a spacer member coupled the rear face of bumper assembly, wherein the spacer member is positioned outboard of and spaced apart from the side support in the vehicle lateral direction and wherein the spacer member extends between at least the side support and the sub-frame in the vehicle vertical direction.

18. The vehicle of claim 17, wherein the side support comprises an outboard face, and wherein the vehicle further comprises a side support catcher portion that is coupled to and extends outboard from the outboard face of the side support and that is positioned rearward of the spacer member in the vehicle longitudinal direction.

19. The vehicle of claim 17, further comprising a sub-frame catcher portion coupled the sub-frame, wherein the sub-frame catcher portion is positioned rearward of the spacer member in the vehicle longitudinal direction.

20. The vehicle of claim 17, wherein the bumper assembly further comprises a bumper extension portion that is coupled to an outboard end of the reinforcement beam and the spacer member is coupled to the bumper extension portion.

* * * * *